United States Patent [19]

Coutant

[11] Patent Number: 4,729,408

[45] Date of Patent: Mar. 8, 1988

[54] CONTROL SYSTEM FOR INDEPENDENT CONTROL OF FLUID ACTUATED DEVICES

[75] Inventor: Alan R. Coutant, Chillicothe, Ill.

[73] Assignee: Caterpillar Inc., Peoria, Ill.

[21] Appl. No.: 940,233

[22] Filed: Dec. 12, 1986

Related U.S. Application Data

[63] Continuation of Ser. No. 754,361, Jul. 12, 1985, abandoned.

[51] Int. Cl.$^4$ ............................................. F15B 13/06
[52] U.S. Cl. ................................... 137/637.1; 74/866; 74/787; 91/513; 137/596.14; 137/596.16
[58] Field of Search ..................... 91/513; 74/866, 878; 137/596.14, 596.16, 627.1

[56] References Cited

U.S. PATENT DOCUMENTS

| 2,464,986 | 3/1949 | Miller . | |
|---|---|---|---|
| 2,591,201 | 4/1952 | Rowand . | |
| 3,289,701 | 12/1966 | Booth et al. | 137/637.1 |
| 3,473,418 | 10/1969 | Ullery | 74/868 |
| 3,540,556 | 11/1970 | Snoy . | |
| 3,757,822 | 9/1973 | Kell . | |
| 3,927,579 | 12/1975 | Golan | 74/752 C |
| 3,973,595 | 8/1976 | Schmoll | 137/637.1 |
| 3,990,553 | 11/1976 | Holzinger et al. | 192/3.57 |
| 4,188,976 | 2/1980 | Austin | 137/637.1 |
| 4,252,148 | 2/1981 | Fochtman et al. | 137/596.15 |
| 4,262,554 | 4/1981 | Ahlen et al. | 137/637.1 X |
| 4,492,251 | 1/1985 | Blake . | |

FOREIGN PATENT DOCUMENTS 2604593 8/1977 Fed. Rep. of Germany .

Primary Examiner—Gerald A. Michalsky
Attorney, Agent, or Firm—J. W. Burrows

[57] ABSTRACT

Control systems are required to selectively control fluid actuated devices, such as clutches, in a transmission. In order to reduce shock loads on the internal elements of the transmission, it is necessary to ensure that only one clutch can be engaged at one time and that no major speed changes or change in direction is allowed. The present invention provides an interlocking arrangement that operates to control a source of pressurized fluid to a plurality of valve mechanism and a plurality of signal control devices. The operation of one of the plurality of valve mechanisms interrupts the flow of fluid to other ones of the plurality of valve mechanisms and to ones of the signal control devices. With this subject arrangement, the shock loads to the transmission are substantially reduced.

13 Claims, 7 Drawing Figures

Fig_1.

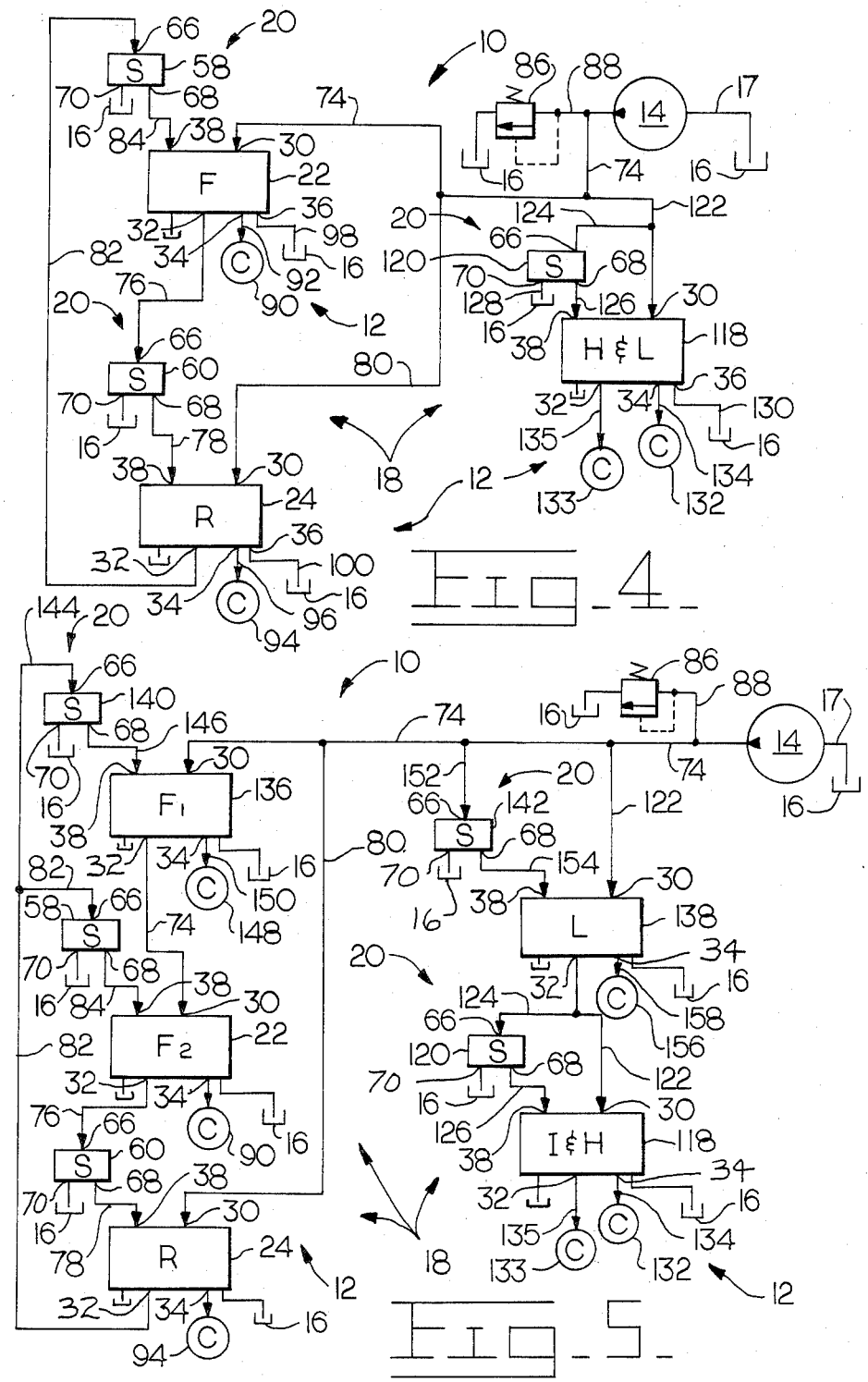

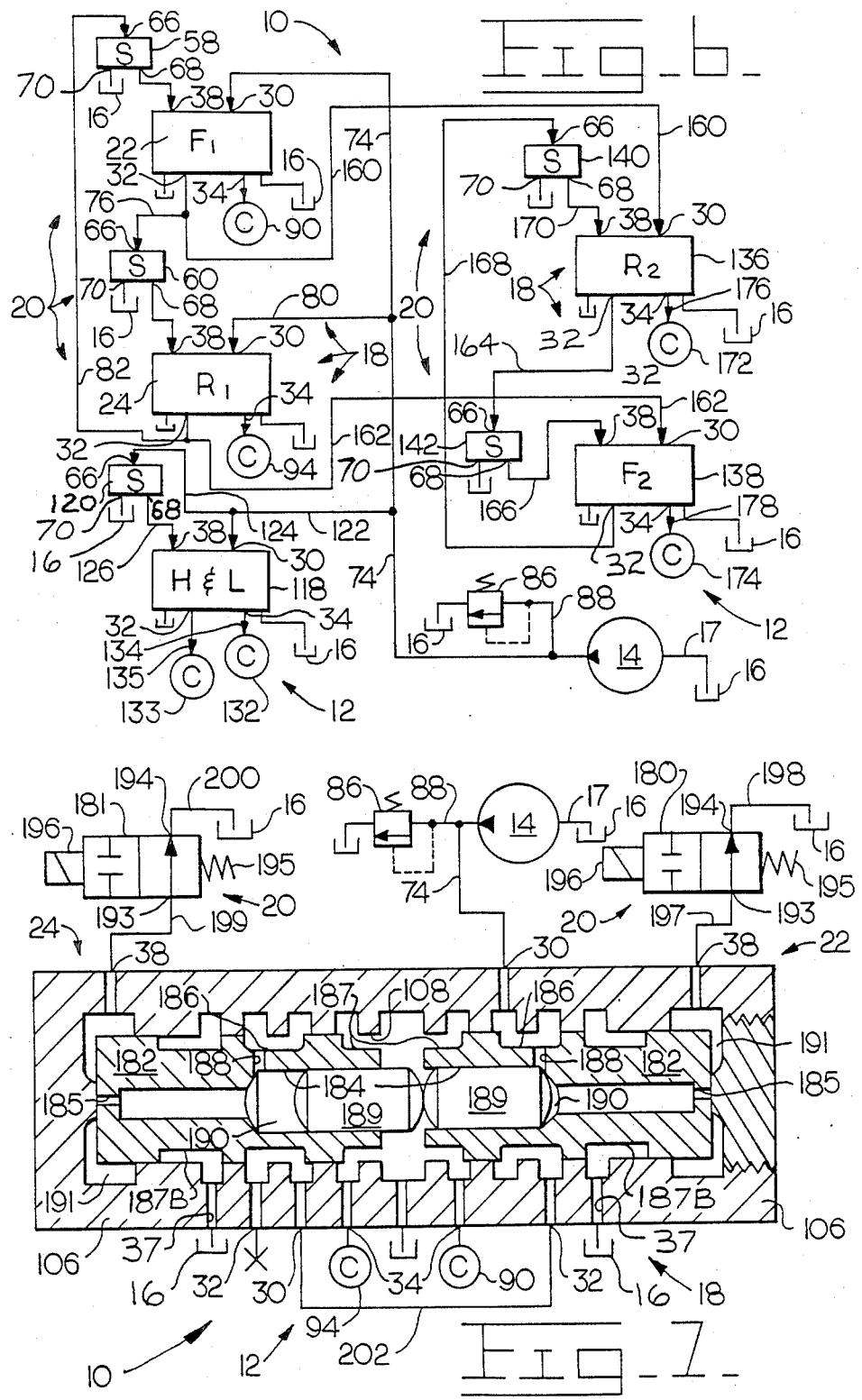

CONTROL SYSTEM FOR INDEPENDENT CONTROL OF FLUID ACTUATED DEVICES

This is a continuation of Ser. No. 754,361, filed July 12, 1985, now abandoned.

DESCRIPTION

1. Technical Field

1. This invention relates generally to a fluid control system for use in a multi-speed transmission to control actuation of a plurality of fluid actuated devices and more particularly to provide control of the fluid actuated devices so that only one of the devices is actuated at one time.

2. Background Art

In many multi-speed transmissions it is desirable to engage only certain clutches in a particular sequence in order to eliminate sudden changes of the force level on the components of the transmission. For example, it is detrimental to the transmission components if the forward clutch and the reverse clutch both became engaged while the vehicle is moving in one direction or the other. Furthermore, in a transmission having several speeds, it is detrimental to the transmission components to have the transmission shift from one of the highest speeds to one of the lowest speeds without going through the intermediate speeds.

In some automatic transmissions a control system is provided which senses operating control pressure and inhibits the transmission from downshifting if the vehicle speed is too fast. Even though this type of control is workable, it is a complicated system requiring several extra components and is restricted for use on automatic transmissions.

In other systems utilizing several clutches, the control valves are independently arranged in the control valve housing and independently actuated in response to movement of a speed or directional control lever. In these arrangements there is a possibility that more than one speed clutch could be engaged at one time. Furthermore, in this type of system, the control valves are relying on the force of a spring to move the valving element to the disengaged position.

In systems having forward and reverse clutches, several arrangements have been provided to ensure that only one of the forward and reverse clutches may be actuated at one time. In these systems, both valving elements are normally physically located in the same bore in such a manner that if one of the valving elements is in an actuated position the other one is physically prohibited from moving to an actuated position. In these systems the valving elements are normally moved to their actuated positions by pressurized fluid and retracted by spring force. These are effective in allowing only one of two clutches to engage at one time but are limited in that both valving elements must be in a common bore and each must rely on spring forces for moving the valving element in one direction of travel.

The present invention is directed to overcoming one or more of the problems as set forth above.

DISCLOSURE OF THE INVENTION

In one aspect of the present invention, a fluid control system is provided for selectively controlling actuation of a plurality of fluid actuated devices. The system includes a source of pressurized fluid, a reservoir, a plurality of valve mechanisms, and a plurality of signal control devices. Each of the control devices is adaptable to actuate a respective one of the plurality of valve mechanisms. A means is provided for hydraulically interlocking a selected one of the plurality of control devices with respect to the source upon operation of a first one of the plurality of valve mechanisms so that only a first one of the plurality of fluid actuated devices may be connected with the source and a second one of the plurality of fluid actuated devices is prohibited from connection with the source.

The present invention provides a control for a transmission that hydraulically interlocks at least one of the valve mechanisms and one of the signal control devices with respect to the source so that only one of the fluid actuated devices may engage at one time. When this relationship is used in a multi-speed transmission, it provides a control that inhibits the transmission from changing from a high speed mode to a low speed mode and/or inadvertently engaging both a forward direction and a reverse direction at the same time. This eliminates any abrupt force changes that would be detrimental to the internal elements of the transmission and other components of the drive train. This arrangement also allows more flexibility in locating the individual valving elements so that the need to have the valving elements in the same bore is less critical.

BRIEF DESCRIPTION OF THE DRAWINGS

FIGS. 4, 5, and 6 are partial schematic and partial diagrammatic drawings illustrating various multi-speed transmission fluid control systems incorporating the present invention; and FIG. 7 is a partial schematic and partial diagrammatic drawing representing yet another embodiment of the present invention.

BEST MODE FOR CARRYING OUT THE INVENTION

Figure 1:
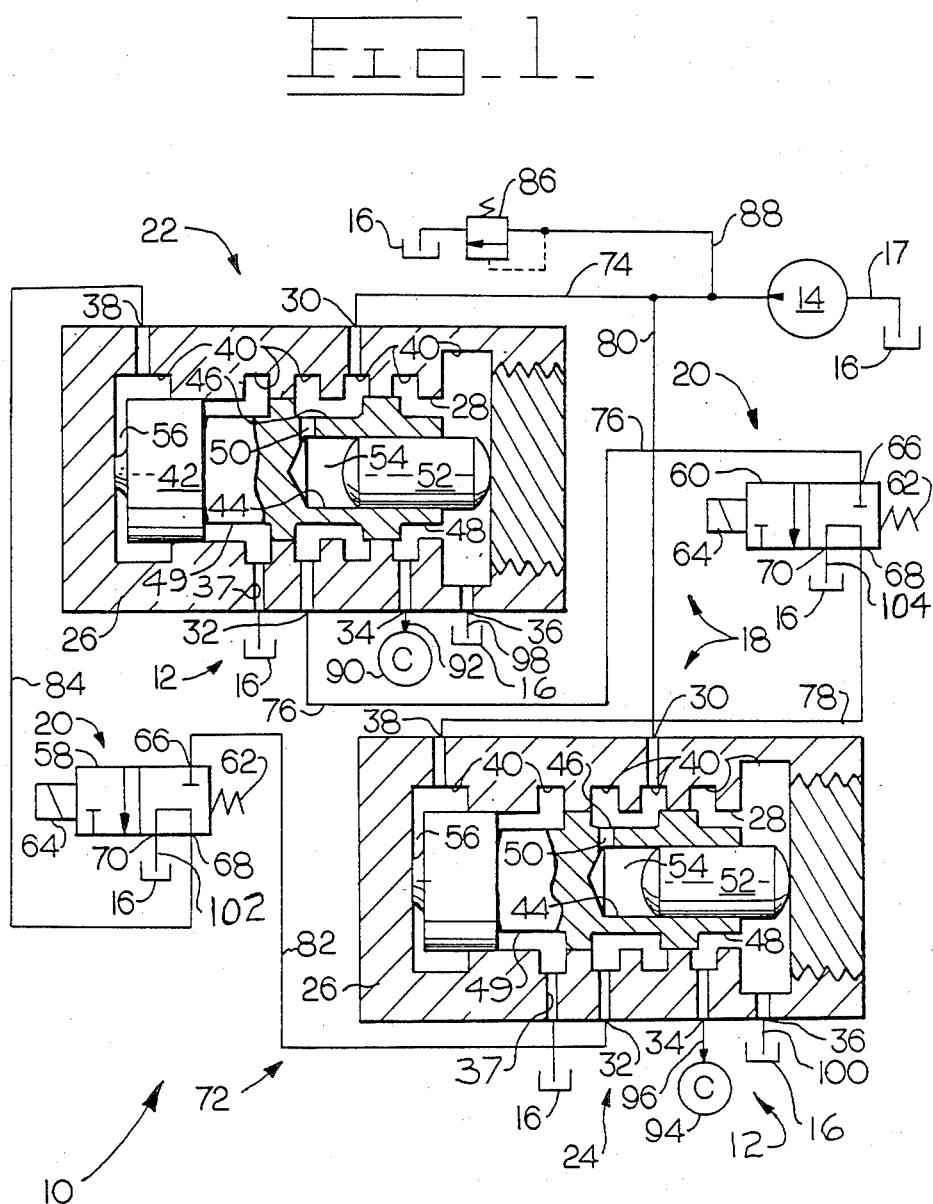
FIG. 1 is a partial schematic and partial diagrammatic drawing representing a transmission fluid control system incorporating an embodiment of the present invention.

Referring now to the drawings, a fluid control system 10 is shown for use in controlling a plurality of fluid actuated devices 12. As an example, the fluid actuated devices may be fluid actuated clutches. The control system includes a source of pressurized fluid, such as a pump 14, connected to a reservoir 16 by a conduit 17, a plurality of valve mechanisms 18, and a plurality of signal control devices 20. Each of the plurality of control devices being adaptable to actuate a respective one of the plurality of valve mechanisms.

Referring more specifically to FIG. 1, the control system 10 includes valve mechanisms 22,24. Each of the valve mechanisms are identical, therefore like elements will have like numbers. Each valve mechanism includes a housing 26 defining a bore 28, an inlet port 30, first and second outlet ports 32,34, a drain port 36, a vent port 37 and an actuator port 38. The housing further defines a plurality of annular grooves 40 circumscribing the bore 28 and being axially spaced from each other sufficient to interconnect the respective inlet, first and second outlet, drain, vent and actuator ports 30,32,34,36,37,38 with the bore 28.

A valving element, such as a spool 42, is slideably disposed in each of the bores 28 and is movable between first and second positions. The spool defines a blind bore 44 at one end thereof. First, second, third grooves 46,48,49 are defined on the outer periphery of the spool and a passage 50 is defined in the spool interconnecting the bottom of the blind bore 44 with the first peripheral groove 46.

A piston 52 is slideably disposed in the blind bore 44. A first pressure chamber 54 is defined in the spool 42 between the piston and the bottom of the blind bore. A second pressure chamber 56 is defined in the housing 26 between the other end of the spool 42 and one end of the bore 28. The second pressure chamber 56 is interconnected with the actuator port 38 through one of the plurality of annular grooves 40.

The control system 10 also includes signal control devices 58,60. Each of the signal control devices are identical, therefore like elements will have like numbers. Each of the signal control devices 58,60 is two position, three-way solenoid operated valves that are biased to a first position by a spring 62 and movable to a second position by a solenoid 64. Each of the control devices defines an inlet port 66, an outlet port 68, and a drain port 70.

A means 72 is provided for hydraulically interlocking a selected one of the plurality of control devices with respect to the source 14 upon operation of a first one of the plurality of valve mechanisms 22,24. The hydraulically interlocking means 72 includes a conduit 74 connecting the source 14 with the inlet port 30 of the valve mechanism 22, a conduit 76 connecting the first outlet port 32 of the valve mechanism 22 with the inlet port 66 of the signal control device 60, a conduit 78 connecting the outlet port 68 of the control device 60 with the actuator port 38 of the valve mechanism 24.

The hydraulically interlocking means 72 also includes a conduit 80 connecting the source 14 with the inlet port 30 of the valve mechanism 24, a conduit 82 connecting the first outlet port 32 of the valve mechanism 24 with the inlet port 66 of the signal control device 58, and a conduit 84 connecting the outlet port 68 of the control device 58 with the actuator port 38 of the valve mechanism 22.

A relief valve 86 is connected to the supply conduit 74,80 of the source 14 in a conventional manner by a conduit 88 and is adaptable to control the maximum pressure level in the control system 10.

A fluid actuated device, such as a clutch 90, is connected to the second outlet port 34 of the valve mechanism 22 by a conduit 92 and a fluid actuated device, such as a clutch 94, is connected to the second outlet port 34 of the second valve mechanism 24, by a conduit 96. Conduits 98,100 respectively connect the drain port 36 of each of the valve mechanisms 22,24 with the reservoir 16 while conduits 102,104 respectively connect the drain ports 70 of the control devices 58,60 with the reservoir 16.

Figure 2:
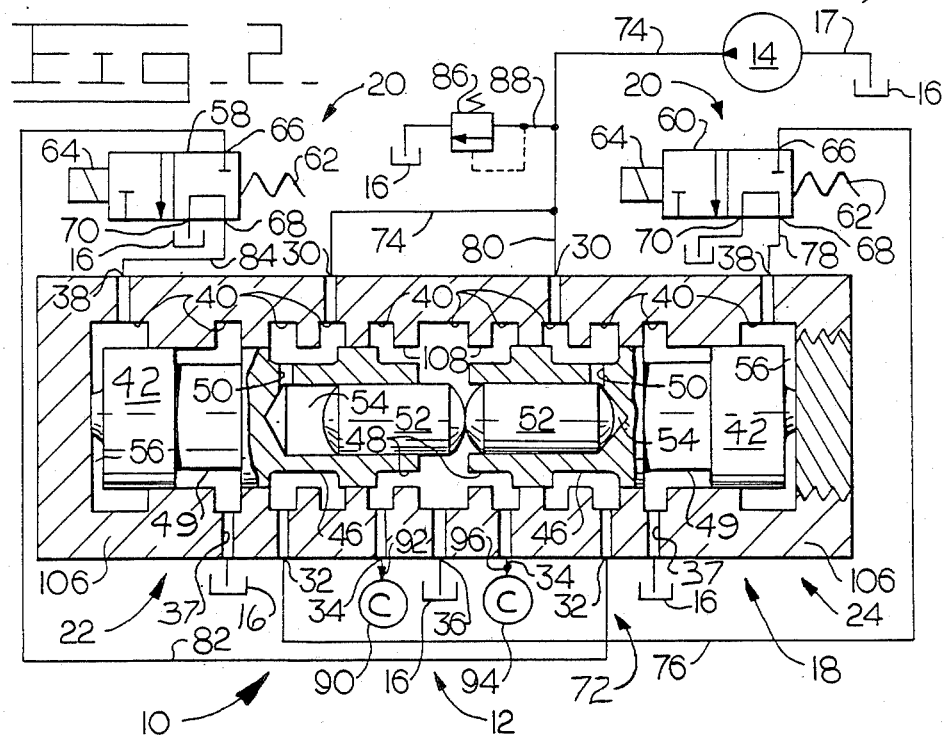
FIGS. 2 and 3 are partial schematic and partial diagrammatic drawings representing other embodiments of the present invention.

In FIG. 2, the control system 10 includes the valve mechanisms 22,24 both located in a common housing 106 which defines a single bore 108. All elements of FIG. 2 that are common with the elements of FIG. 1 have the same element numbers. The spools 42 are disposed in the common bore 108 so that movement of one of the spools 42 to its second position physically prohibits the movement of the other one of the spools 42 from its first position.

The means 72 for hydraulically interlocking also provides interlocking of one signal control device 60 and the first valve mechanism 22 with respect to the source 14 upon initial operation of the valve mechanism 24.

Figure 3:
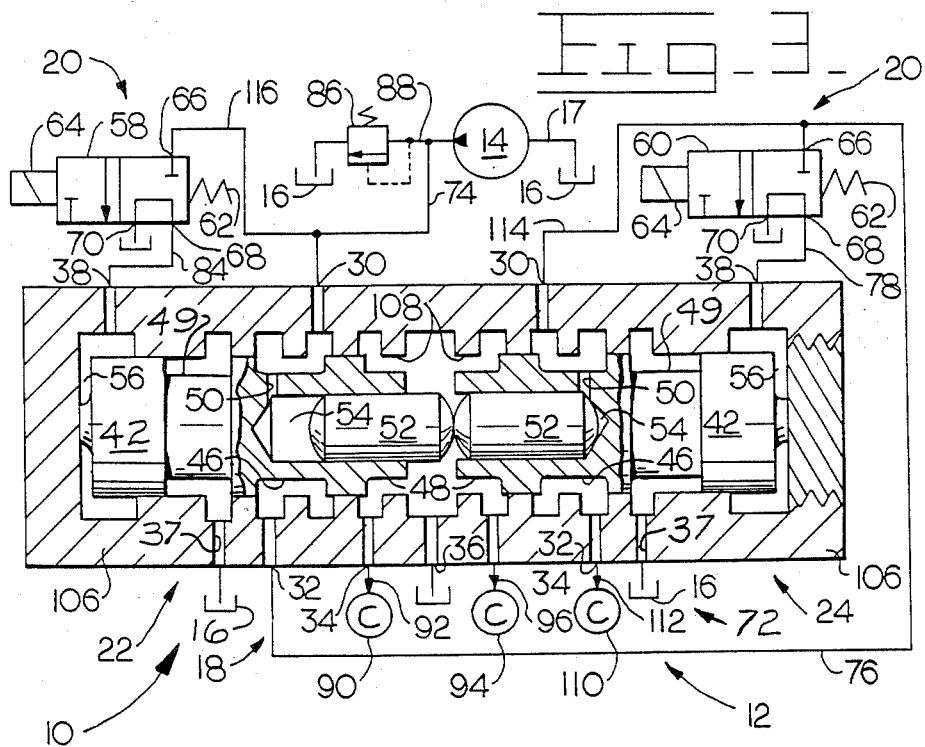

In FIG. 3, the control system 10 includes the valve mechanism 22,24 both located in the common housing 106 as set forth in FIG. 2. All elements of FIG. 3 that are common with the elements of FIGS. 1 or 2 have the same element numbers. The movement of one of the spools 42 in the valve mechanisms 22/24 of FIG. 3 functions to physically prohibit movement of the other one of the spools 42 in the same manner as illustrated in FIG. 2.

The control system 10 also includes a fluid actuated device, such as a clutch 110, connected to the first outlet port 32 of the valve mechanism 24 by a conduit 112. The means 72 for hydraulically interlocking also includes a conduit 114 connecting the first outlet port 32 of the valve mechanism 22 through the conduit 76 with the inlet port 30 of the valve mechanism 24 so that the fluid actuated device 110 is connected with the source 14 of pressurized fluid when the fluid actuated devices 58,60 are free from actuation.

A conduit 116 connects the inlet port 66 of the control device 58 to the source 14 by connecting to the conduit 74 between the source 14 and the inlet port 30 of the valve mechanism 22.

In FIG. 4, the system 10 includes a valve mechanism 118 and a signal control device 120 each being respectively connected to the source 14 and adapted for use in a multi-speed transmission (not shown). All elements of FIG. 4 that are common with the elements of FIG. 1 have the same element numbers. A conduit 122 connects the inlet port 30 of the valve mechanism 118 to the conduit 74 downstream of the source 14 and a conduit 124 connects the inlet port 66 of the control device 120 with the conduit 122 upstream of the valve mechanism 118. A conduit 126 connects the outlet port 68 of the control device 120 with the actuator port 38 of the valve mechanism 118. Conduits 128,130 respectively connect the drain ports 70,36 of the control device 120 and the valve mechanism 118 with the reservoir 16. The control system 10 of FIG. 4 also includes fluid actuated devices, such as clutches 132,133, respectively connected to the second and first outlet ports 34,32 of the valve mechanism 118 by conduits 134,135.

In FIG. 5, the control system 10 further includes two additional valve mechanisms 136,138 and two additional signal control devices 140,142. All elements of FIG. 5 that are common with the elements of FIGS. 1 and 4 have the same element numbers.

The valve mechanism 136 is located in the conduit 74 with the inlet port 30 of the valve mechanism 136 connected to the part of the conduit 74 leading from the source 14 and the first outlet port 32 of the valve mechanism 136 is connected to the part of the conduit 74 leading to the inlet port 30 of the valve mechanism 22. A conduit 144 connects the inlet port 66 of the control device 140 to the conduit 82 between the valve mechanism 24 and the control device 58. A conduit 146 connects the outlet port 68 of the control device 140 with the actuator port 38 of the valve mechanism 136. A fluid actuated device 148 is connected to the second outlet port 34 of the valve mechanism 136 by a conduit 150.

The valve mechanism 138 is located in the conduit 122 with the inlet port 30 of the valve mechanism 138 connected to the part of the conduit 122 leading from the connection with the conduit 74 and the first outlet port 32 of the valve mechanism 138 is connected to the part of the conduit 122 leading to the inlet port 30 of the valve mechanism 118. A conduit 152 connects the inlet port 66 of the control device 142 to the conduit 74 from the source 14 and a conduit 154 connects the outlet port 68 of the control device 142 with the actuator port 38 of the valve mechanism 138. A fluid actuated device, such as a clutch 156, is connected to the second outlet port 34 of the valve mechanism 138 by a conduit 158.

In FIG. 6, the control system 10 includes the two additional valve mechanisms 136,138 and the two additional signal control devices 140,142 arranged in a different manner. All elements of FIG. 6 that are common to FIGS. 1 and 4 have the same element numbers.

A conduit 160 connects the inlet port 30 of the valve mechanism 136 with the conduit 76 between the valve mechanism 22 and the control device 60. A conduit 162 connects the inlet port 30 of the valve mechanism 138 to the conduit 82 between the valve mechanism 24 and the control device 58. A conduit 164 connects the first outlet port 32 of the valve mechanism 136 to the inlet port 66 of the control device 142 while a conduit 166 connects the outlet port 68 of the control device 142 to the actuator port 38 of the valve mechanism 138. The inlet port 66 of the control device 140 is connected to the first outlet port 32 of the valve mechanism 138 by a conduit 168 and the outlet port 68 of the control device 140 is connected to the actuator port 38 of the valve mechanism 136 by a conduit 170. Fluid actuated devices, such as clutches 172,174, are respectively connected to the second outlet ports 34 of the valve mechanisms 136,138 by conduits 176,178.

In FIG. 7, the signal control devices of the control system 10 uses two position, two-way solenoid operated valves 180,181 in place of the previously described three-way valves. All elements of FIG. 7 that are common to the elements of FIGS. 1 and 2 have the same element numbers.

First and second spools 182 are slideably disposed in the single bore 108 of the common housing 106. Each of the spools 182 defines a blind bore 184 at one end and a restrictive passage 185 at the opposite end in communication with the blind bore. First, second, and third peripheral groove 186,187,187B are defined on each spool 182 axially spaced from each other. A passage 188 is defined in each spool 182 and interconnects the first peripheral groove 186 with the bottom of the blind bore 184.

A piston 189 is slideably disposed in the blind bore 184 of each of the spools 182. A first pressure chamber 190 is defined in each of the spools 182 between the piston 189 and the bottom of the blind bore 184. A second pressure chamber 191 is defined in the common housing 106 between the other end of each of the spools 182 and the ends of the bore 108. The first and second spools 182 are disposed in the bore 108 so that movement of one of the spools 182 to its second position physically prohibits movement of the other one of the spools 182 from its first position.

Each of the signal control devices 180,181 has an inlet port 193 and an outlet port 194 and is spring biased to a first position by a spring 195 and movable to a second position in response to actuation of a solenoid 196. The inlet port 193 of the control device 180 is connected to the actuator port 38 of the valve mechanism 22 by a conduit 197 and the outlet port 194 is connected to the reservoir 16 by a conduit 198. The inlet port 193 of the control device 181 is connected to the actuator port 38 of the valve mechanism 24 by a conduit 199 and the outlet port 194 is connected to the reservoir 16 by a conduit 200.

A conduit 202 connects the first outlet port 32 of the valve mechanism 22 with the inlet port 30 of the valve mechanism 24 and the first outlet port 32 of the valve mechanism 24 is blocked. The fluid actuated devices 90,94 are connected to the valve mechanism 22,24 as previously described in FIGS. 1 and 2.

Industrial Applicability

The valve mechanisms 22, 24, 118, 136, and 138 as illustrated in FIGS. 1–6 each operate in the same manner. Consequently, only the operation of one of the valves will be described. A source of pressurized fluid is received at the inlet port 30 and is selectively directed through the valve in response to the position of the spool 42. The spool 42 is movable between the first position (as illustrated) at which the inlet port 30 is in communication with the first outlet port 32 across the first peripheral groove 46 while the second outlet port 34 is in communication with the drain port 36 across the second peripheral groove 48 and the second position at which the inlet port 30 is in communication with the second outlet port 34 while the first outlet port 32 and drain port 36 are blocked from both the inlet port 30 and the second outlet port 34. With the spool 42 in its second position, the first outlet port 32 is in communication with the reservoir 16 across the third groove 49 and through the vent port 37.

The spool 42 is biased to its first position in response to the pressurized fluid from the source 14 being directed through the passage 50 into the first pressure chamber 54. The pressurized fluid acting on the end of the piston 52 and the bottom of the blind bore 44 effectively creates a force tending to move the spool 42 toward the second pressure chamber 56, as viewed in the drawings. The spool 42 is biased towards the opposite direction in response to the source 14 of pressurized fluid being selectively directed through the actuator port 38 to the second pressure chamber 56. The pressurized fluid in the second pressure chamber acts on the end of the spool 42 to effectively move the spool 42 towards the second position. The cross-sectional area of the end of the spool 42 is greater than the area of the piston 52. Consequently, when pressurized fluid from the source 14 is simultaneously in the first and second pressure chambers 54,56 the spool 42 is maintained in its second position. By using this differential area relationship, no springs are required and greater biasing forces in both directions are achieved. If springs were used in place of the differential area relationship, the control spool could possibly disengage whenever the force of the spring became greater than the force established by the minimum pressure times the area of the end of the spool opposite the spring. This situation could occur during clutch fill since the control pressure drops quite low.

The signal control devices 58, 60, 120, 140, and 142 as illustrated in FIGS. 1–6 each operate in the same manner. Therefore, only the operation of one will be described. Each of the devices is movable between the first position at which the inlet port 66 is blocked while the outlet port 68 is in communication with the reservoir 16 through the drain port 70 and the second position at which the inlet port 66 is in communication with the outlet port 68 while the drain port 70 is blocked from both the inlet and outlet ports 66,68. Each of the devices is biased to the first position in response to the biasing force of the spring 62. Each of the devices is movable to the second position in response to actuation of the solenoid 64.

FIG. 1 represents a system having two fluid operated clutches 90,94. These clutches 90,94 may be either forward or reverse clutches or possibly two different speed clutches. Each of the inlet ports 30 of the valve mechanisms 22,24 is respectively connected to the source 14 by the conduits 74,80. Each of the spools 42 is maintained in its first position by the force of the pressurized fluid in the first pressure chamber 54. Additionally, the pressurized fluid is directed to the first outlet port 32 of each valve mechanism 22,24. From the first outlet port 32 of the valve mechanism 22, the fluid is directed to the inlet port 66 of the control device 60 by conduit 76. Likewise, the fluid from the first outlet port 32 of the valve mechanism 24 is directed to the inlet port 66 of the control device 58.

With both of the control devices 58,60 in their first position, the inlet ports 66 are blocked and the spools 42 of the valve mechanisms 22,24 remain in their first or neutral position. Upon selective operation of the control device 58, pressurized fluid at the inlet port 66 is directed to the second pressure chamber 56 in the valve mechanism 22 through the conduit 84 and actuator port 38. The force of the pressurized fluid acting on the larger cross-sectional area of the other end of the spool 42 moves the spool to its second position. With the spool 42 in its second position, the pressurized fluid at the inlet port 30 is directed to the clutch 90 for engagement thereof. In this condition the system is in one mode of operation, for example, a forward direction.

Since the spool 42 of the valve mechanism 22 is in the second position, the first outlet port 32 is blocked from the source of pressurized fluid at the inlet port 30 but is open to the reservoir 16 through the vent port 37. Therefore no pressurized fluid is available to the control device 60 and any leakage fluid from the source is vented to the reservoir. Consequently, the valve mechanism 24 cannot be inadvertently operated and the force resulting from the pressurized fluid being in the first pressure chamber 54 of the valve mechanism 24 maintains the spool 42 in the first position. With the spool 42 of the valve mechanism 24 being in the first position, the clutch 94 remains disengaged.

Upon selectively returning the control device 58 to its first position, the spool 42 of the valve mechanism 22 returns to its first position and disengages the clutch 90. If the control device 60 is now selectively operated, the spool 42 of the valve mechanism 24 is moved to its second position to engage the clutch 94. With the spool 42 of the valve mechanism 24 in the second position, the first outlet port 32 is blocked from the source 14 but open to the vent port 37 and as indicated above, no pressurized fluid is available to the inlet port 66 of the control device 58. Therefore, the spool 42 of the valve mechanism 22 cannot be moved to its second position so the clutch 90 remains disengaged.

In FIG. 2, the clutches 90,94 are operated in exactly the same manner as set forth above in FIG. 1. However in FIG. 2, the valve mechanisms 22,24 are located in the single bore 108 of the common housing 106. In this arrangement, if the spool 42 of the valve mechanism 22 is moved to its second position, the one end of the spool 42 of the valve mechanism 22 contacts the one end of the spool 42 of the valve mechanism 24 and physically prohibits the spool 42 of the valve mechanism 24 from moving from its first position. Likewise, if the spool 42 of the valve mechanism 24 is moved to its second position, then the spool 42 of the valve mechanism 22 is prohibited from moving from its first position. This further ensures that only one of the clutches 90,94 is engaged at one time.

In FIG. 3, the spools 42 of the valve mechanism 22,24 are both located in the single bore 108 and function to prohibit movement of one of the spools if the other one is operated. However, in this arrangement the inlet port 66 of the control device 58 is connected directly to the source 14 by the conduit 116 and the conduit 74. Furthermore, the first outlet port 32 of the valve mechanism 22 is connected to the inlet port 30 of the valve mechanism 24 by conduits 76,114 as well as being connected to the inlet port 66 of the control device 60 and the first outlet port 32 of the valve mechanism 24 is connected to the clutch 110.

With both of the valve mechanism 22,24 in their first positions, fluid flow from the source 14 engages the clutch 110 by the flow from the source being directed through the conduit 74, across the valve mechanism 22, through the conduits 76,114 and across the valve mechanism 24. In this type of arrangement, the clutch 110 is normally a high speed clutch and is always engaged when the valve mechanisms 22,24 are in neutral in order to inhibit the internal elements within the transmission from freely turning. In most instances, this would be used in conjunction with a directional clutch so that the vehicle would not be able to move even when the third clutch 110 is engaged.

Upon selective operation of the control device 58, the spool 42 of the valve mechanism 22 moves to its second position thus engaging the clutch 90. With the spool 42 of the valve mechanism 22 in its second position, no flow is available to the control device 60 or to the inlet 30 of the valve mechanism 24. Consequently, neither of the clutches 94,110 can be engaged.

When the control device 58 is deactivated, the spool 42 of the valve mechanism 22 returns to its first position and the clutch 110 is engaged as set forth above to inhibit the free turning of the internal elements of the transmission. Upon selective actuation of the control device 60, the spool 42 of the valve mechanism 24 is moved to its second position which disengages the clutch 110 and engages the clutch 94. With the spool 42 of the valve mechanism 24 in its second position, the spool 42 of the valve mechanism 22 is physically blocked from moving. Therefore, there is no way for the clutch 90 to inadvertently engage.

FIGS. 4, 5, and 6 illustrate various combinations of the arrangements set forth in FIGS. 1, 2, and 3. In the arrangements of FIGS. 4–6, the control systems utilize a combination of directional clutches and speed clutches. Furthermore, in these arrangements, it is a primary objective that only one directional clutch and one speed clutch be engaged at one time. It is recognized that many different combinations could be arranged by using the principles set forth in FIGS. 1–3 without departing from the essence of the invention.

In FIG. 4, the control system 10 uses three valve mechanisms 22,24,118 to provide forward operation, reverse operation, and high and low speeds in both directions. Consequently, this control system 10 provides two forward and two reverse speeds. The operation of the valve mechanism 22 for forward direction and the valve mechanism 24 for reverse direction is identical as that set forth in the operation of FIGS. 1 or 2.

In the operation of the high and low speed clutches 133,132, the high speed clutch 133 is always in communication with the source 14, when the valve mechanism 118 is in its first position by the fluid flow being directed through the inlet port 30, across the spool 42, and through the first outlet port 32. As indicated with respect to clutch 110 of FIG. 3, the engagement of clutch 133 inhibits the internal elements of the transmission from turning freely and creating unwanted heat. With both of the directional valve mechanisms 22,24 in their first or neutral position, there is no tendency for the vehicle to move.

With one of the forward or reverse clutches 90,94 engaged, the vehicle is automatically in the high speed mode of operation since the clutch 133 is already engaged. The operator obtains the low speed mode by selectively actuating the control device 120 to move the spool 42 of the high-low valve mechanism 118 to its second position. In the second position, the high speed clutch 133 is disengaged and the low speed clutch 132 is engaged.

In FIG. 5, the control system 10 uses five valve mechanisms 22,24,118,136,138 to provide another combination of valve mechanisms to obtain a control having six forward speeds and three reverse speeds.

It should be recognized that the valve mechanisms 138 and 118 respectively control the low speed clutch 156, the intermediate speed clutch 132, and the high speed clutch 133. The operation of the controls for these valve mechanisms 138,118 is identical to the operation of the controls for the valve mechanisms 22,24 as clearly described with respect to FIG. 3.

Furthermore, the operation of the directional valve mechanisms 22,24 are identical to the operation of the valve mechanisms 22,24 as clearly set forth in the description of FIGS. 1 or 2. This being based on the assumption that the directional valve mechanism 136 has been removed and the ends of the conduit 74 connected. By removing the valve mechanism 136, it is apparent that the control system would function to provide three forward speeds and three reverse speeds.

By including the directional valve mechanism 136 as illustrated, the control system has two different forward directional clutches 90,148. Consequently, when coupled with the three speed clutches 132,133,156 six forward speeds are obtained.

As clearly illustrated, when the forward directional valve mechanism 136 is engaged, no fluid flow is available to the other forward direction valve mechanism 22 plus no fluid flow is available to the control device 60. Therefore, neither of the forward or reverse directional clutches 90,94 can be engaged.

If the forward direction clutch 90 is engaged, the reverse direction clutch 94 cannot be engaged and furthermore, if the forward directional valve mechanism 136 inadvertently engages, the vehicle speed would merely reduce to a slower speed. This small change in speed does not induce high shock loads to the transmission. Likewise, if the reverse directional valve mechanism 24 is actuated there is no fluid flow available to the control devices 58,140. Therefore neither of the forward clutches 90,148 can be engaged.

The same situation holds true when considering the speed clutches 132,133,156. If either of the speed clutches 132,133 is engaged and the speed valve mechanism 138 inadvertently actuates, the flow to the other clutch 132/133 is interrupted and the vehicle speed reduces to a slower speed without inducing high shock loads to the components of the transmission.

In FIG. 6, the control system use five valve mechanisms 22,24,118,136,138 to provide a different combination of the valve mechanisms to obtain a control having four forward and four reverse speeds.

In this arrangement, the directional valve mechanisms 22,24 and the speed valve mechanism 118 functions in an identical manner as that set forth with respect to FIG. 4. The arrangement of FIG. 4 provided two forward and two reverse speeds. In this arrangement, the two additional forward and reverse speeds are obtained by adding the additional reverse clutch 172 and the forward clutch 174 along with their associated controls.

In operation, each of the directional clutches 90,94,172,174 functions with each of the speed clutches 132,133 to provide the four forward and four reverse speeds. As previously set forth, only one of the directional clutches and one of the speed clutches can be engaged at one time.

For example, if the forward directional valve mechanism 22 is engaged, no fluid flow is available to the control device 60 or the reverse valve mechanism 136. Consequently, neither of the reverse clutches 94,172 can be engaged. If the reverse directional valve mechanism 24 is engaged, no fluid flow is available to the control device 58 or the forward directional valve 138. Consequently, neither of the forward clutches 90,174 can be engaged.

Likewise, if the forward directional valve mechanism 138 is engaged, no flow is available to the control device 66. Therefore, the reverse clutch 172 cannot be engaged. By having the forward directional valve mechanism 138 and the reverse directional valve mechanism 24 in the common bore 108 as illustrated in FIG. 3, the reverse clutch 94 cannot be engaged as long as the clutch 174 is engaged. The same situation holds true if the reverse directional valve mechanism 136 is engaged. No fluid flow is available to actuate the control device 142. Also, the reverse directional valve mechanism 136 can be in the common bore 108 with the forward directional valve mechanism 22. Therefore neither the forward clutch 174 or the forward clutch 90 can be engaged at the same time as the reverse clutch 172. In either of these situations, the vehicle speed in a given direction can be changed but the direction of travel cannot be inadvertently changed. A speed change between the forward clutches 90,174 or between the reverse clutches 94,172 will not induce high shock loads into the transmission.

In FIG. 7, an alternate embodiment is illustrated in which two-way solenoid operated control devices are used in place of the three-way solenoid operated control devices of FIGS. 1-6 without departing from the essence of the invention.

In this arrangement, the fluid flow from the source 14 is directed to the inlet port 30 of the valve mechanism 22 and passes through the valve across the first annular groove 186 of the spool 182 to the outlet port 32. The fluid flow from the outlet port 32 is directed by conduit 202 to the inlet port 30 of the valve mechanism 24 and across the first annular groove 186 to the outlet port 32 which in this embodiment is blocked. Simultaneously the fluid flow from the source is directed through the passage 188 of the spool 182 of the valve mechanism 22 to the first pressure chamber 190. From the chamber 190, the fluid flow passes through the restrictive passage 185 to the second pressure chamber 191 and on to the reservoir 16 through the outlet 38 and the control device 180. With the control device 180 in its first illustrated position, the second pressure chamber 191 is vented to the reservoir and the effective force resulting from the pressurized fluid in the first pressure chamber 190 upstream of the restrictive passage 185 maintain the spool 182 of the valve mechanism 22 in its first position. The spool 182 of the valve mechanism 24 is maintained in its first position in the same manner by the pressurized fluid being directed therethrough and across the control device 181 to the reservoir.

When the control device 180 is actuated, the flow path to the reservoir 16 is blocked and the pressure of the fluid in the second pressure chamber 191 increases. The increasing pressure acting on the larger cross-sectional area of the spool 182 moves the spool to its second position engaging the clutch 90. Simultaneously, the flow to the second valve mechanism 24 is blocked and the clutch 94 cannot be engaged. If the valve mechanism 24 is operated to engage the clutch 94, then the clutch 90 cannot be engaged because the spool 182 of the valve mechanism 24 physically prohibits the spool 182 of the valve mechanism 22 from moving from its first position.

The control system 10, as set forth above, provides a means for hydraulically interlocking the valve mechanisms with respect to the source so that only one clutch can be operated at one time or when used in combination with both speed and directional clutches, only one each of the speed and directional clutches can be engaged at one time. This arrangement provides simple construction and numerous ways that the valve mechanisms in the control system can be arranged in order to obtain various combination of speeds while using the same basic components. This arrangement further provides that any inadvertent engagement of another valve mechanism or tendency to engage will not allow heavy shock loads to be induced into the transmission. The system does allow the transmission to make small changes in speed in a given direction upon inadvertent engagement of another valve mechanism, but in these conditions the induced forces to the transmission are minor.

Other aspects, objects and advantages of this invention can be obtained from a study of the drawinq, the disclosure and the appended claims.

I claim:

1. A fluid control system for selectively controlling actuation of a plurality of fluid actuated devices, said system including a source of pressurized fluid, a reservoir, a plurality of valve mechanisms operative to control the fluid from said source to said fluid actuated devices, and a plurality of signal control valves each being operative to actuate a respective one of the plurality of valve mechanisms, comprising:

means for hydraulically interlocking a selected one of the plurality of signal control valves with respect to the source upon operation of a first one of the plurality of valve mechanisms so that only a first one of the plurality of fluid actuated devices may be connected with the source and a second one of the plurality of fluid actuated devices is prohibited from connection with the source; and the plurality of valve mechanisms includes a second valve mechanism and each of the plurality of valve mechanisms has an inlet port, an actuator port, a drain port, and first and second outlet ports, and each valve mechanism is movable between a first position at which the inlet port is in open communication with the first outlet port and the second outlet is in open communication with the drain port and a second position at which the inlet port is blocked from the first outlet port and is in open communication with the second outlet port.

2. The fluid control system, as set forth in claim 1, wherein the means for hydraulically interlocking also provides interlocking one of a second one of the signal control valves and the first valve mechanism with respect to the source upon initial operation of the second one of the plurality of valve mechanisms.

3. The fluid control system, as set forth in claim 2, wherein the plurality of valve mechanisms include a third valve mechanism and the plurality of signal control devices include a third signal control device and the means for hydraulically interlocking further provides interlocking one of the first and second signal control devices and one of the first and second valve mechanisms with respect to the source upon initial actuation of the third valve mechanism.

4. The fluid control system, as set forth in claim 3, wherein movement in either direction of each of the plurality of valve mechanisms is initiated solely by fluid pressure.

5. The fluid control system, as set forth in claim 1, wherein the second outlet port of each of the valve mechanisms is connected respectively to first and second fluid actuated devices, and including a third fluid actuated device connected to the first outlet port of the second valve mechanisms and the hydraulically interlocking means includes a conduit connecting the first outlet port of the first valve mechanism with the inlet port of the second valve mechanism so that the third fluid actuated device is connected with the source of pressurized fluid when the first and second fluid actuated devices are free from actuation.

6. The fluid control system, as set forth in claim 1, wherein each of the plurality of signal control valves is a two position valve having an inlet port, an outlet port, and a drain port and each is operatively connected between the source and the actuator port of the respective valve mechanism to selectively direct a fluid pressure signal to move the respective valve mechanism from its first position to its second position.

7. The fluid control system, as set forth in claim 6, wherein movement in either direction of each of the plurality of valve mechanisms is initiated solely by fluid pressure.

8. The fluid control system, as set forth in claim 7, wherein the second outlet port of each of the plurality of valve mechanisms is connected to the respective one of the plurality of fluid actuated devices and the hydraulically interlocking means includes a conduit connecting the source of pressurized fluid to the inlet port of the first valve mechanism, a conduit connecting the first outlet port of the first valve mechanism to the inlet port of the second two position valve, and a conduit connecting the outlet port of the second two position valve to the actuator port of the second valve mechanism.

9. The fluid control system, as set forth in claim 8, wherein the hydraulically interlocking means includes a conduit connecting the source to the inlet port of the second valve mechanism, a conduit connecting the first outlet port of the second valve mechanism to the inlet port of the first two position valve, and a conduit connecting the outlet port of the first two position valve to the actuator port of the first valve mechanism.

10. The fluid control system, as set forth in claim 9, wherein each of the plurality of signal control valves is spring biased to a first position at which the inlet port is blocked while the outlet port is connected with the drain port and each is solenoid actuated to a second position at which the inlet port is connected with the outlet port and the drain port is blocked.

11. The fluid control system, as set forth in claim 9, wherein the plurality of valve mechanisms includes a third valve mechanism and the plurality of signal control devices includes a third signal control device; the third valve mechanism is located in the conduit upstream of the first valve mechanism by connecting the supply conduit from the source of pressurized fluid to the inlet port of the third valve mechanism and connecting the first outlet port of the third valve mechanism to the portion of the conduit that is connected to the inlet port of the first valve mechanism; the conduit that connects the first outlet port of the second valve mechanism to the inlet port of the first two position valve also connects to the inlet port of the third two position valve; and the hydraulically interlocking means includes a conduit connecting the outlet port of the third two position valve to the actuator port of the third valve mechanism.

12. The fluid control system, as set forth in claim 11, wherein the plurality of valve mechanisms include third and fourth valve mechanisms and the plurality of signal control devices include third and fourth signal control devices each respectively connected to the actuator port of the respective third and fourth valve mechanisms, and the means for hydraulically interlocking provides interlocking the third and fourth valve mechanisms by connecting the inlet port of the third valve mechanism to the conduit that connects the first outlet port of the first valve mechanism to the inlet port of the second two position valve, by connecting the inlet port of the fourth valve mechanism to the conduit that connects the first outlet port of the second valve mechanism to the inlet port of the first two position valve, by connecting the first outlet port of the third valve mechanism to the inlet port of the fourth two position valve, and by connecting the first outlet port of the fourth valve mechanism to the first inlet port of the third two position valve.

13. A fluid control system for selectively controlling actuation of a plurality of fluid actuated devices, said system including a source of pressurized fluid, a reservoir, a plurality of valve mechanisms operative to valve the fluid from said source to said fluid actuated devices, and a plurality of signal control valves each being operative to actuate a respective one of the plurality of valve mechanisms, comprising:

means for hydraulically interlocking a selected one of the plurality of signal control valves with respect to the source upon operation of a first one of the plurality of valve mechanisms so that only a first one of the plurality of fluid actuated devices may be connected with the source and a second one of the plurality of fluid actuated devices is prohibited from connection with the source; and the plurality of valve mechanisms includes a second valve mechanism and each of the first and second valve mechanisms are arranged in a single bore of a common housing so that movement of one of the first and second valve mechanisms to actuate one of the first and second fluid actuated devices physically blocks movements of the other valve mechanism so that the other fluid actuated device cannot be actuated while the one fluid actuated device is actuated.

* * * * *